United States Patent
Baumeister et al.

(10) Patent No.: US 10,931,173 B2
(45) Date of Patent: Feb. 23, 2021

(54) COMBINED COOLING AND DUST EXTRUSION DEVICE AND METHOD

(71) Applicant: GE Renewable Technologies, Grenoble (FR)

(72) Inventors: Stefan Baumeister, Birr (CH); Sebastien Bruna, Belfort (FR); Jerome Hamburger, Belfort (FR); Thierry Auzolle, Belfort (FR)

(73) Assignee: GE Renewable Technologies, Grenoble (FR)

( * ) Notice: Subject to any disclaimer, the term of this patent is extended or adjusted under 35 U.S.C. 154(b) by 652 days.

(21) Appl. No.: 15/712,224

(22) Filed: Sep. 22, 2017

(65) Prior Publication Data
US 2018/0083511 A1    Mar. 22, 2018

(30) Foreign Application Priority Data
Sep. 22, 2016    (EP) .................... 16290180

(51) Int. Cl.
*H02K 9/28*    (2006.01)
*H01R 39/48*    (2006.01)
(Continued)

(52) U.S. Cl.
CPC ............... *H02K 9/28* (2013.01); *H01R 39/48* (2013.01); *H01R 39/085* (2013.01); *H01R 39/38* (2013.01); *H02K 9/04* (2013.01)

(58) Field of Classification Search
CPC ............ H02K 9/00; H02K 9/005; H02K 9/02; H02K 9/04; H02K 9/08; H02K 9/10;
(Continued)

(56) References Cited

U.S. PATENT DOCUMENTS

| 3,486,055 A | 12/1969 | Lipstein |
| 5,283,493 A | 2/1994 | Hokanson et al. |

(Continued)

FOREIGN PATENT DOCUMENTS

| DE | 1903733 A1 | 9/1969 |
| DE | 102007054675 A1 | 5/2008 |

(Continued)

OTHER PUBLICATIONS

English Translation Description DE102012203098 (Year: 2013).*
(Continued)

*Primary Examiner* — Nguyen Tran
(74) *Attorney, Agent, or Firm* — Dority & Manning, P.A.

(57) ABSTRACT

A combined cooling and abrasion particles removal system and method for providing cooling and removing abrasion particles in a contact region between a brush and a slip ring of an electromechanical machine, the system comprising a passage for accommodating the brush and having a front opening adapted to face the slip ring, at least one supply tube with an outlet for blowing a gaseous medium at least partially into a direction towards a free space adjacent to the front opening, and at least one suction tube with an inlet opening for sucking off the gaseous medium and the abrasion particles from the free space. In order to pick up abrasion particles and provide sufficient cooling, the free space merges with a vortex chamber for generating a vortex of the gaseous medium carrying the abrasion particles in operation of the system.

16 Claims, 6 Drawing Sheets

(51) Int. Cl.
*H01R 39/38* (2006.01)
*H01R 39/08* (2006.01)
*H02K 9/04* (2006.01)

(58) Field of Classification Search
CPC .. H02K 9/12; H02K 9/14; H02K 9/16; H02K 9/18; H02K 9/28
USPC ............. 310/12.29, 52, 57, 58, 62, 227, 232
See application file for complete search history.

(56) References Cited

U.S. PATENT DOCUMENTS

| | | | |
|---|---|---|---|
| 8,933,599 B2 * | 1/2015 | Tsuge | H02K 5/20 |
| | | | 310/59 |
| 2009/0021102 A1 * | 1/2009 | Hofel | H02K 9/28 |
| | | | 310/228 |
| 2012/0324673 A1 | 12/2012 | Vasseur | |
| 2016/0238030 A1 | 8/2016 | Chou | |

FOREIGN PATENT DOCUMENTS

| | | |
|---|---|---|
| DE | 102012203098 A1 | 4/2013 |
| EP | 3073586 A1 | 3/2015 |
| GB | 1 005 433 A | 9/1965 |
| JP | H01-99451 A | 4/1989 |
| TW | M284136 U | 12/2005 |

OTHER PUBLICATIONS

Extended European Search Report and Opinion issued in connection with corresponding EP Application No. 17190738.9 dated Jan. 24, 2018.

European Search Report issued in connection with corresponding EP application No. 16290180.5 dated Mar. 7, 2017.

* cited by examiner

COMBINED COOLING AND DUST EXTRUSION DEVICE AND METHOD

BACKGROUND OF THE INVENTION

The present invention relates to a combined cooling and abrasion particles removal system for an electromechanical machine, an electromechanical machine installation comprising a combined cooling and abrasion particles removal systems, and a method for providing cooling and removing abrasion particles in an electromechanical machine installation.

Electromechanical machines are commonly rotating electric machines such as synchronous generators to be mechanically connected to a shaft of gas or steam turbine (turbogenerator) or a synchronous generator to be mechanically connected to the shaft of a hydro turbine (hydrogenerator) or an asynchronous generator or a synchronous or asynchronous electric motor or also other types of electromechanical machines.

In general, electromechanical machines comprise a slip ring and brushes contacting the slip ring in respective contact regions. In operation, the brushes and the slip ring are subject to mechanical wear. As the brushes commonly comprise carbon, they wear off due to abrasion. The abrasion causes the formation of especially carbon particles which tend to contaminate the electromechanical machine by the formation of carbon dust. The carbon dust can potentially lead to machine failures.

The prior art proposes to remove the carbon dust at the brushes by means of suction devices designed to at least partly take in arising carbon dust. Furthermore, there are abrasion removal systems according to the prior art comprising cleaning brushes located next to the suction devices. However, none of these known abrasion removal systems is able to fully satisfy the need of removing the carbon dust.

As a previous solution, the applicant of the present application invented "An Abrasion Removal System" which is described in European Patent Application No. EP 15 290 080.9, the contents of which is fully incorporated herein by reference. This abrasion removal system for removing abrasion from a brush of an electric machine has a housing arranged around the space of the brush, a supply to blow a gaseous medium into the housing, and a suction system for intake of the abrasions out of the housing.

Further examples of prior art systems may be found in German Patent Application Publication No. DE 10 2012 203 098 and U.S. Pat. No. 3,486,055.

SUMMARY OF THE INVENTION

It is an object of the present invention to provide an enhanced abrasion removal system. In particular, an embodiment is directed to an improvement in the cooling of a contact region between the brush and the slip ring. It is important to control the temperature in that region in order to allow a stable patina to form on the surface of the slip ring. The patina helps in prolonging the lifetime of the brush and the slip ring. Moreover, it is an aim of embodiments of the present invention to generally improve the performance of a system for combined abrasion particles removal and cooling, in particular, by lowering costs and complexity of the system.

These objects are solved by a combined cooling and abrasion particles removal system, an electromechanical machine installation, and a method for providing cooling and removing abrasion particles as disclosed and described herein.

According to a first aspect, the combined cooling and abrasion particles removal system for providing cooling and removal of abrasion particles in a contact region between a brush and a slip ring of an electromechanical machine solves these objects in that the system comprises a passage for accommodating the brush and having a front opening adapted to face the slip ring. In an embodiment, the system comprises at least one conduit arranged to direct the flow of a gaseous medium or fluid towards the face of the slip ring.

In the systems disclosed in prior art documents DE 10 2012 203 098 and U.S. Pat. No. 3,486,055 the gaseous medium is directed across the face of a plurality of slip rings. An embodiment of the present invention enables more efficient collection of abrasion particles and better cooling. By directing the flow of the gaseous medium towards the face of the slip ring, the abrasive particles can be contained in a volume, referred to herein as a "free space", adjacent to the front opening. In an embodiment, the invention prevents the spread of abrasive particles across a number of slip rings, as occurs in the prior art.

To order to improve the removal of abrasive particles from the surface of the slip ring, the conduit may be arranged to increase the velocity of the gaseous medium or fluid flowing through the conduit.

The combined cooling and abrasion particles removal system may comprise at least one supply tube. The supply tube may have an outlet for blowing or directing the gaseous medium at least partially into a direction towards the free space.

According to another embodiment, the outlet may be shaped like, or in the form of, a slit, wherein the slit may be at least section-wise. The slit may encompass the front opening or the free space in an annular manner. Thereby, the free space can be essentially entirely surrounded by the outlet and thus the blow stream which acts like a curtain that picks up particles from the slip ring and prevents particles from exiting a respective space above the slip ring covered by the system or a housing thereof, for example, the free space.

In an embodiment of the invention, a housing of the system may be arranged to provide or leave a gap between the outlet and the slip ring. Accordingly, during operation, air surrounding the system may be sucked into the area between the system and the slip ring. In an embodiment in operation, air surrounding the system may be sucked into the free space. Such a stream of auxiliary gas sucked in from the surrounding area of the housing improves the collection of particles from the slip ring and prevents the particles from exiting a space covered by the housing.

The combined cooling and abrasion particles removal system may define a vortex chamber for receiving the flow of the gaseous medium. The vortex chamber is arranged to generate a vortex, in an embodiment. The vortex chamber may merge with a space adjacent to the contact region. The system may be arranged to deflect the gaseous medium against the slip ring, towards the vortex chamber. The deflection may be in an inwardly direction. The vortex chamber may be arranged to receive the deflected gaseous medium, which may contain abrasion particles removed from the slip ring. The system may be arranged to generate a vortex of the gaseous medium which carries the abrasion particles during operation of the system. The flow of the gaseous medium from the conduit may move abrasion particles into the vortex chamber.

Moreover, the auxiliary gas stream adds to the blow stream, i.e. injected volume flow, from the outlet such that they together form the vortex. A volume flow of the vortex and the air sucked off through the outlet may therefore be bigger than the injected volume flow of the blow stream alone. This helps in further optimising velocities of the streams and the vortex.

An embodiment of the invention collects abrasive particles prevents them from being spread through the electromechanical machine by providing a flow of gaseous medium which acts as both a barrier to the abrasive particles to prevent their spread, and moves the particles into the vortex chamber where they may be collected and removed. An embodiment of the invention does away with integrated fans, filters and recirculated air flows which are required by prior art systems.

According to a further aspect, in an electromechanical machine installation according to an embodiment of the present invention, these objects are solved by an installation that comprises at least one combined cooling and abrasion particles removal system according to an embodiment of the present invention for providing cooling and removal of abrasion particles from the contact region.

According to a further aspect, in a method according to an embodiment of the present invention, these objects are solved in that a gaseous medium may be blown at least partially into the direction of a free space adjacent to the contact region, and in that a vortex of the gaseous medium is generated adjacent to the free space for carrying away the abrasion particles.

These solutions have the decisive advantage over the prior art that the vortex in maximises the speed of the gaseous medium and/or any abrasion particles taken up thereby as a fluidised stream. On the one hand, a high speed of the fluid stream helps in picking the abrasion particles up in the area of the contact region and keeping them in motion so that they do not deposit in other regions of the electromechanical machine. On the other hand, the high fluid speed helps in maximising a cooling effect of the fluid in a controllable manner, i.e. a heat transfer between the contact region and the fluid can be controlled such that the contact region remains in a temperature range for the formation of the patina on the slip ring.

In addition to that, an increase of the fluid speed in comparison to systems and methods according to the prior art helps in reducing the size of the system itself as well as of any auxiliary parts thereof, such as fans, filters, tubes and alike, such that manufacturing and installation costs of the system are reduced in comparison to the prior art. Furthermore, due to reduced size of the system or its components, maintenance and operational costs are reduced by system and method according to embodiments of the present invention in comparison to the prior art.

An embodiment of the invention enables a reduction in size of the system so that the system may be used to remove particles from each contact region. Thereby improving the capture of abrasive particles and the cooling of an electromechanical machine. Accordingly, in a further aspect of the invention there is provided an apparatus system for providing cooling and removal of abrasion particles to a plurality of contact regions, wherein each contract region is between a brush and a slip ring of an electromechanical machine. The apparatus may comprise a plurality of conduits, wherein each conduit of the plurality of conduits is arranged to direct a flow of a gaseous medium at least partially towards the face of a slip ring of the plurality of sliprings. In an embodiment, each contact region of the plurality of contact regions is associated with a conduit of the plurality of conduits, each conduit removing abrasive particles from, and cooling, the associated contact region.

The aspects, embodiments and solutions to the objects underlying the present invention described herein may be further improved and combined with the following embodiments of the present invention. The respective embodiments and/or aspects may be implemented independently of each other as required by a certain application, or may be readily combined.

According to a first further embodiment, an outer wall portion of the vortex chamber may be curved in such a way that it promotes formation of the vortex. The curvature of the outer wall portion may be chosen such that the gaseous medium and possibly any abrasion particles taken up by the gaseous medium are guided such that a vortex is generated and stabilised. Within the vortex, the gaseous medium and particles therein are held in a fluidised state such that they may be removed, e.g. sucked up from the vortex chamber as a single fluid stream.

According to another embodiment, the further system may comprise at least one suction tube with an inlet for extracting or sucking off the gaseous medium and the abrasion particles from the vortex chamber and/or the free space. Thereby, the gaseous medium blown at least partially into the direction of the free space adjacent to the contact region can be sucked off from the free space together with the abrasion particles. The suction tube can be connected to an under pressure source, such as a suction fan for example, for sucking off the gaseous medium and the particles from the free space. By keeping the abrasion particles within the vortex in the vortex chamber connected to the free space, the particles can be entirely sucked off and moved out of the system.

According to another embodiment, the vortex chamber may connect the free space to the inlet. Thereby, the fluid of gas and particles enters the vortex at the free space and is transported in a fluidised state within the vortex to the inlet. The vortex can enter the inlet in such a way that all particles are sucked off without being able to deposit in or around the free space, the vortex chamber or the suction tube.

According to another embodiment, the inlet may be dimensioned such that it essentially extends over an entire vertical height of the vortex chamber. This helps in giving the vortex enough room at the inlet in order to be stable enough for not letting any particles deposit near the inlet. In other words, a maximum speed of the fluid stream within the vortex can be essentially maintained at the inlet when the fluid enters the suction tube.

According to another embodiment, the inlet may widen towards the vortex chamber. This enables a smooth transition between the vortex chamber and the inlet which helps minimising turbulences at the inlet that may lead to a de-acceleration of particles and thus their undesired deposit. The fluid may enter the inlet from the vortex chamber in an essentially laminar flow state. Moreover, by the widening a cross sectional area of the suction tube starting at the inlet is reduced along the suction tube so that a speed of the fluid is rather increased or at least essentially kept constant.

According to a further embodiment, the vortex chamber may surround a tubular wall section forming the passage in an annular manner. An outer wall portion of the passage for the brush may form an inner wall portion of the vortex chamber. The vortex chamber thereby surrounds the passage and hence the contact region such that the vortex can be effectively generated essentially around the entire contact region for picking up all abrasion particles and providing homogenous cooling.

According to another embodiment, the vortex chamber may taper, particularly towards the free space. This helps in stabilising the vortex in a way that it merges with the free space and originates to from while an eye of the vortex is formed above the free space essentially in the centre of the cross-section of the vortex chamber.

According to further embodiment, the at least one supply tube may have a guiding section for directing a blow stream of the gaseous medium, particularly under an angle α (alpha) with respect to a tangent of an outer circumference of the slip ring towards the slip ring. Blowing the gaseous medium at the slip ring under the angle helps in reliably picking up particles from the circumference which may adhere there due to electrostatic and other effects. Picking up the particles may be further improved by directing the blow stream against the direction of rotation of the slip ring in operation.

According to another embodiment, the angle α (alpha) may be between 30 and 70°, more particularly between 40 and 60°, most particularly between 45 and 55° or approximately 50°. Under such an angle, any particles can be optimally picked up from the circumference of the slip ring by the gaseous medium. Further, the formation of the vortex is enhanced as the blow stream bounces back from the circumference of the slip ring into the vortex chamber.

According to another embodiment, the guiding section may taper, in an embodiment continuously towards the outlet. This arrangement enables a stable laminar blow stream, which may be referred to as an "air blade", to be formed which may impinge on the circumference of the slip ring in a desired manner. After the guiding section has fully tapered, the outlet is shaped like a slit from which the blow stream exits and is directed towards the slip ring.

According to another embodiment, a cross-sectional area of the supply tube may remain essentially the same. Alternatively, the cross-sectional area of the supply tube reduces towards the guiding section, particularly up to the outlet. Thereby, the speed of the gaseous medium may be increased on its way from the at least one supply tube towards the outlet or at least held essentially stable. Investigations have shown that a velocity of the blow stream when impinging on the outer circumference of the slip ring should be between 15 and 22 m/s, more particularly between 17 and 20 m/s for reliably picking up particles from the circumference and/or providing appropriate cooling of the contact region.

According to another embodiment, an inner wall section of the guiding section may extend essentially or substantially in parallel to an outer contour of the vortex chamber. Thereby, on the one hand, the gaseous medium within the blow stream can already be provided with at least an initial spin in the direction of a spin of the vortex so that formation and stabilisation of the vortex is facilitated. On the other hand, the other dimensions of the system or housing thereof can be minimised by a compact design of the guiding section and the vortex chamber.

BRIEF DESCRIPTION OF THE DRAWINGS

The present invention is now to be explained more closely by means of different embodiments and with reference to the attached drawings. Further characteristics and advantages will be more apparent from the description of non-exclusive embodiments of a combined cooling and abrasion particles removal system according to the present invention, illustrated by way of non-limiting example in the accompanying drawings, in which.

DETAILED DESCRIPTION

Figure 1:
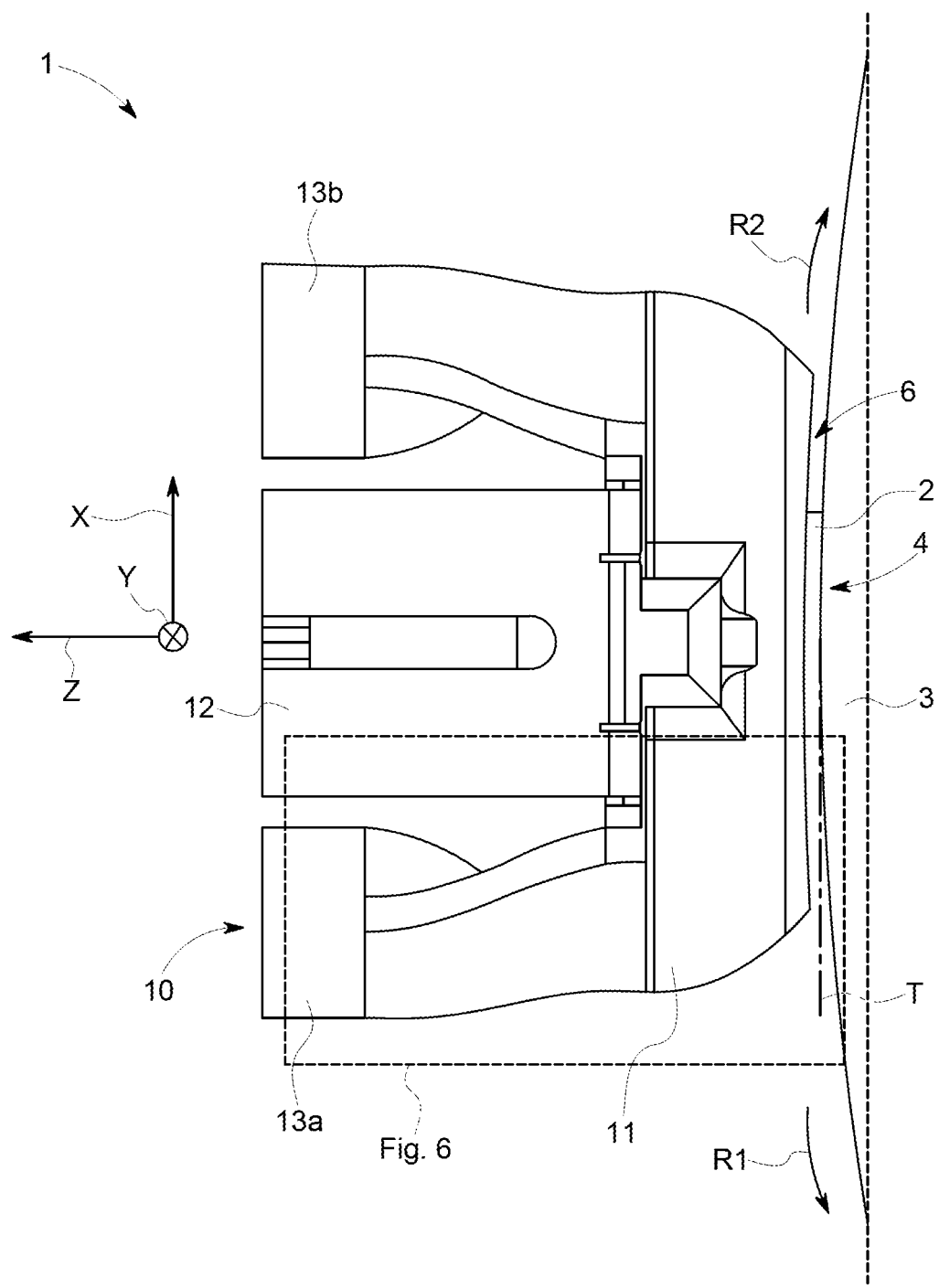
FIG. 1 is a schematic top view of a section of an electromechanical machine installation comprising a system.

FIG. 1 shows a part of an electromechanical machine installation 1, such as a generator and/or motor a schematic top view. The installation 1 comprises a brush 2 and a slip ring 3. The brush 2 contacts the slip ring 3 in a contact region 4 at an outer circumference 5 of the slip ring 3 for transferring an electrical current between the brush 2 and the slip ring 3. Hence, the brush 2 exerts a pressure onto the slip ring 3 essentially in longitudinal direction of the brush 2 running perpendicularly to a tangent T of the outer circumference 5 of the slip ring in the centre of the brush 2.

The brush 2 may be mounted to a stator of the electromechanical machine installation 1 while the slip ring 3 as part of a rotor of the electric mechanical machine installation 1. Hence, the slip ring 3 moves with respect to the brush 2 in at least one of two rotational directions R1, R2. When the electromechanical machine installation 1 is used as a generator as well as a motor, the slip ring 3 will move with respect to the brush 2 along the first rotational direction R1 or the second rotational direction R2 as required by the respective mode of operation of the electromechanical machine installation 1.

Furthermore, the electromechanical machine installation 1 comprises a free space 6 bordered by the brush 2, the slip ring 3 and a combined cooling and abrasion particles removal system 10 according to an exemplary embodiment of the present invention with which the electromechanical machine installation 1 is equipped. The system 10 comprises a housing 11. A passage 12 is formed at the housing 11 for accommodating the brush 2.

A conduit comprising two supply tubes 13a, 13b are formed at the housing 11 for guiding a gaseous medium towards the contact region 4 (see FIG. 6) and the face of the slip ring. The supply tubes 13a, 13b are associated to the first rotational direction R1 and a second rotational direction R2, respectively. A blowing device (not shown), for example a fan, is connected to each of the supply tubes 13a, 13b separately or in a combined manner.

The electromechanical machine installation 1 extends along a longitudinal direction X, essentially running in parallel to the tangent T, a transversal direction Y running in parallel to a shaft (not shown) of the electromechanical machine installation 1 carrying the rotor equipped with the slip ring 3, and a height direction Z extending in parallel to a radial direction of the slip ring 3. Together, the longitudinal direction X, the transversal direction Y, and the height direction Z form a Cartesian coordinate system.

Figure 2:
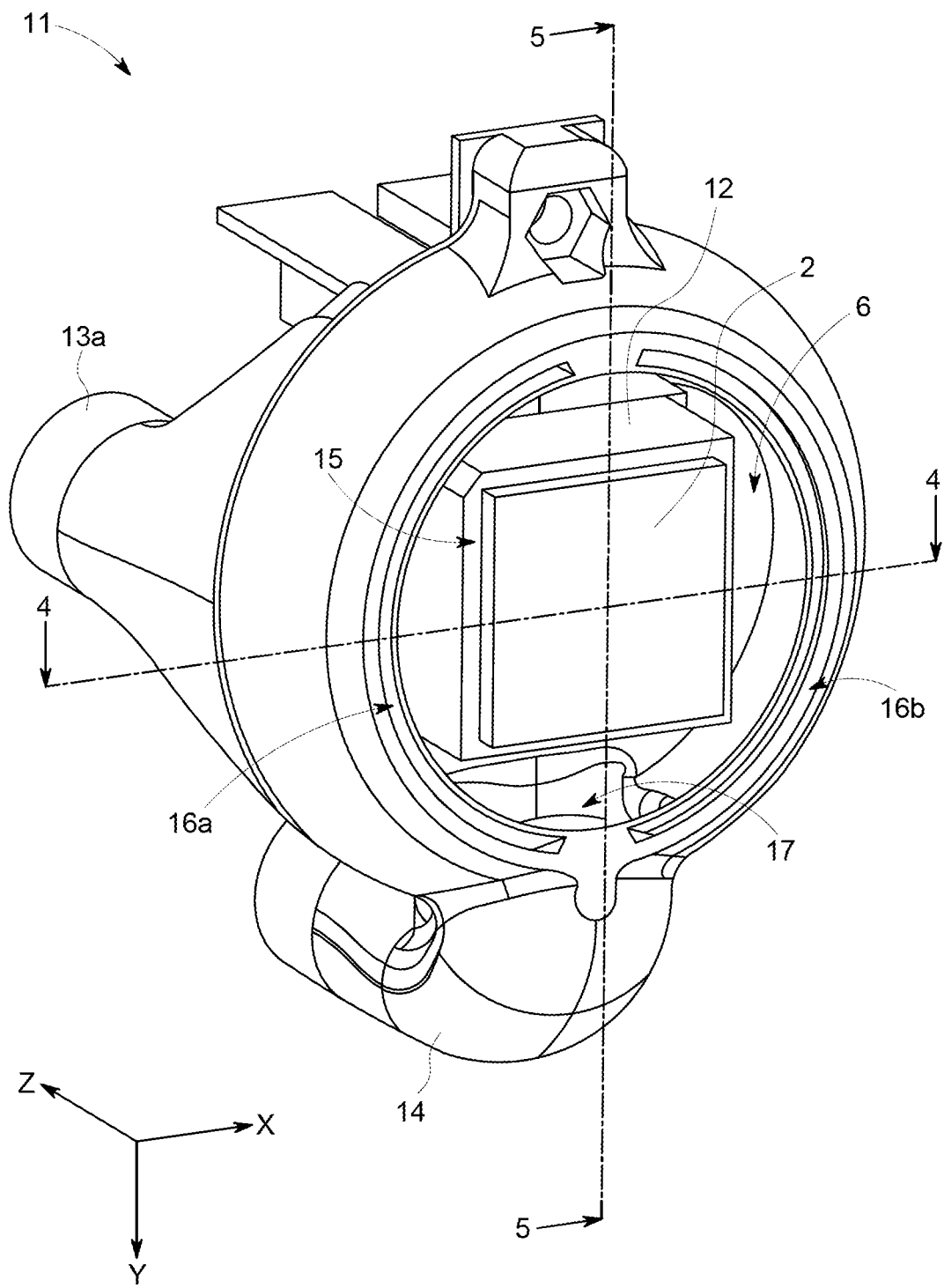
FIG. 2 is a schematic perspective view of a housing of the system illustrated in FIG. 1.

FIG. 2 shows a schematic perspective view of the housing 11 from below with the brush 2 accommodated in the passage 12. In addition to the passage 12 and the supply tubes 13a, 13b, a suction tube 14 is formed at the housing 11. The suction tube 14 is connected to a suction device (not shown).

While the passage 12 leads to an opening 15 facing against the height direction Z towards the slip ring 3, the supply tubes 13a, 13b end in outlets 16a, 16b, respectively, directed towards the free space 6. The suction tube 14 has an inlet 17 opening arranged within an interior of the housing 11. The free space 6 surrounds the opening 15 and can be regarded as being circumferentially encompassed by the two outlets 16a, 16b each formed as slits on a side of the housing 11 facing in a direction against the height direction Z.

Figure 3:
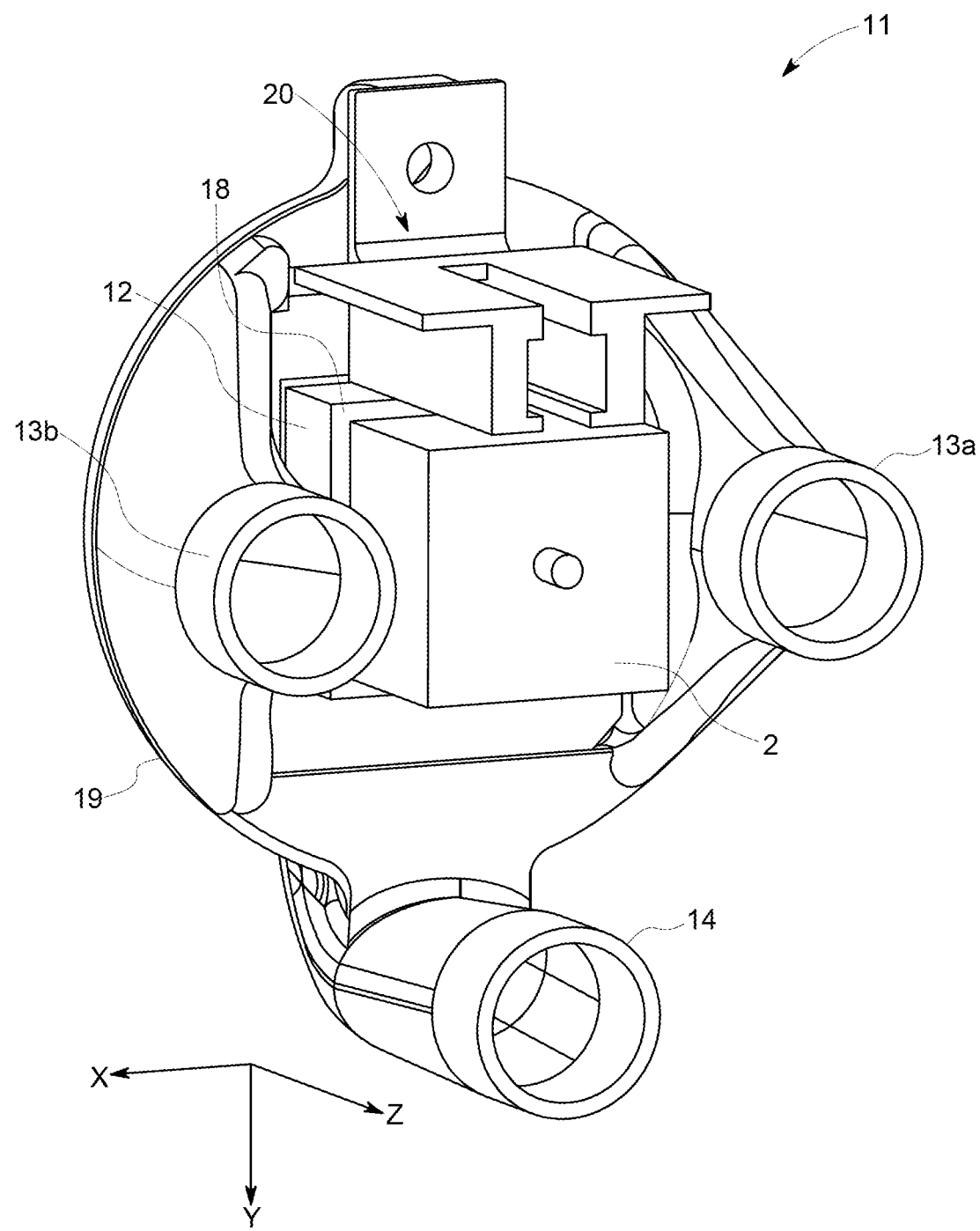
FIG. 3 is another schematic perspective view of a housing of the system illustrated in FIG. 2.

FIG. 3 shows a schematic perspective view of the housing 11 from the top, showing a back side of the housing. The brush 2 juts above an upper rim 18 of the passage 12 in the height direction Z, i.e. a radial direction of the rotor. The passage 12 is located essentially in the centre of a circular base portion 19 of the housing 11. The supply tubes 13a, 13b and the suction tube 14 extend from the base portion 19 in the height direction Z. Furthermore, mounting means 20, e.g. fixations, are formed at the housing 11 for mounting the housing 11 within the electromechanical machine installation 1.

Figure 4:
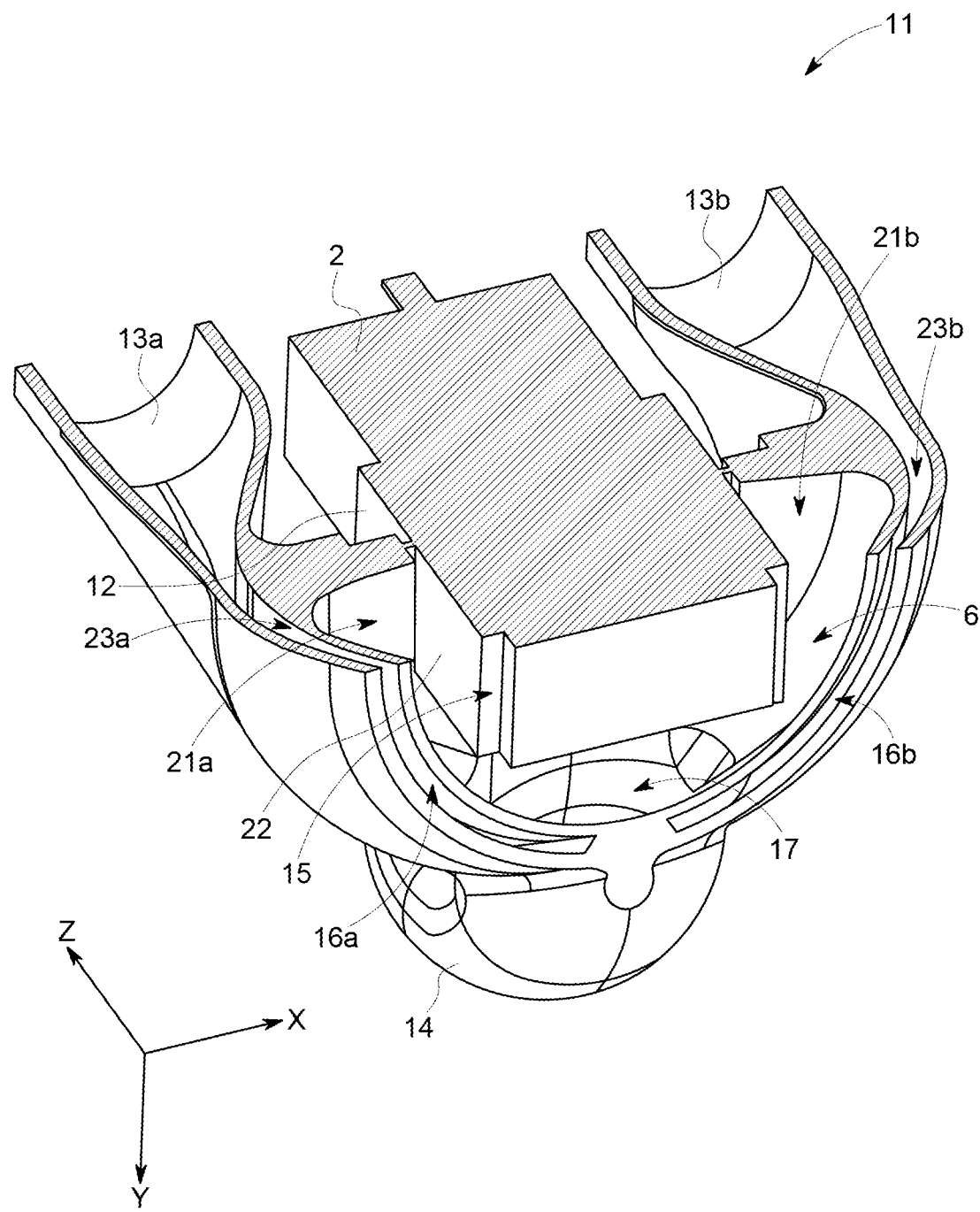
FIG. 4 is a schematic cross-sectional view along the cross-sectional line A-A of the housing illustrated in FIG. 2.

FIG. 4 shows a schematic perspective cross-sectional view of the housing 11 along the cross-section line A-A illustrated in FIG. 2. The free space 6 merges with two vortex chambers 21a, 21b associated to the outlets 16a, 16a, respectively. The vortex chambers 21a, 21b surround a tubular wall section 22 forming a part of the passage 12 and are joined in the region of the outlet 17 and the mounting means 20 so as to form a single cavity for generating a vortex within the housing 11 (see FIGS. 5 and 6).

Furthermore, the supply tubes 13a, 13b are provided with a guiding section 23a, 23b, respectively. The shape of a cross-sectional area of the supply tubes 13a, 13b is changed within the guiding sections 23a, 23b in order to form a transition between a cylindrical upper portion of each of the supply tubes 13a, 13b adapted for connecting the blowing device thereto, and the slit-shaped outlets 16a, 16b. The velocity a gaseous medium 100 travelling down the supply tubes is increased by this configuration. The shape of the guiding section 23a, 23b follows an outer contour of the vortex chambers 21a, 21b, in particular of a curved outer wall portion 24 of the vortex chambers 21a, 21b.

Figure 5:
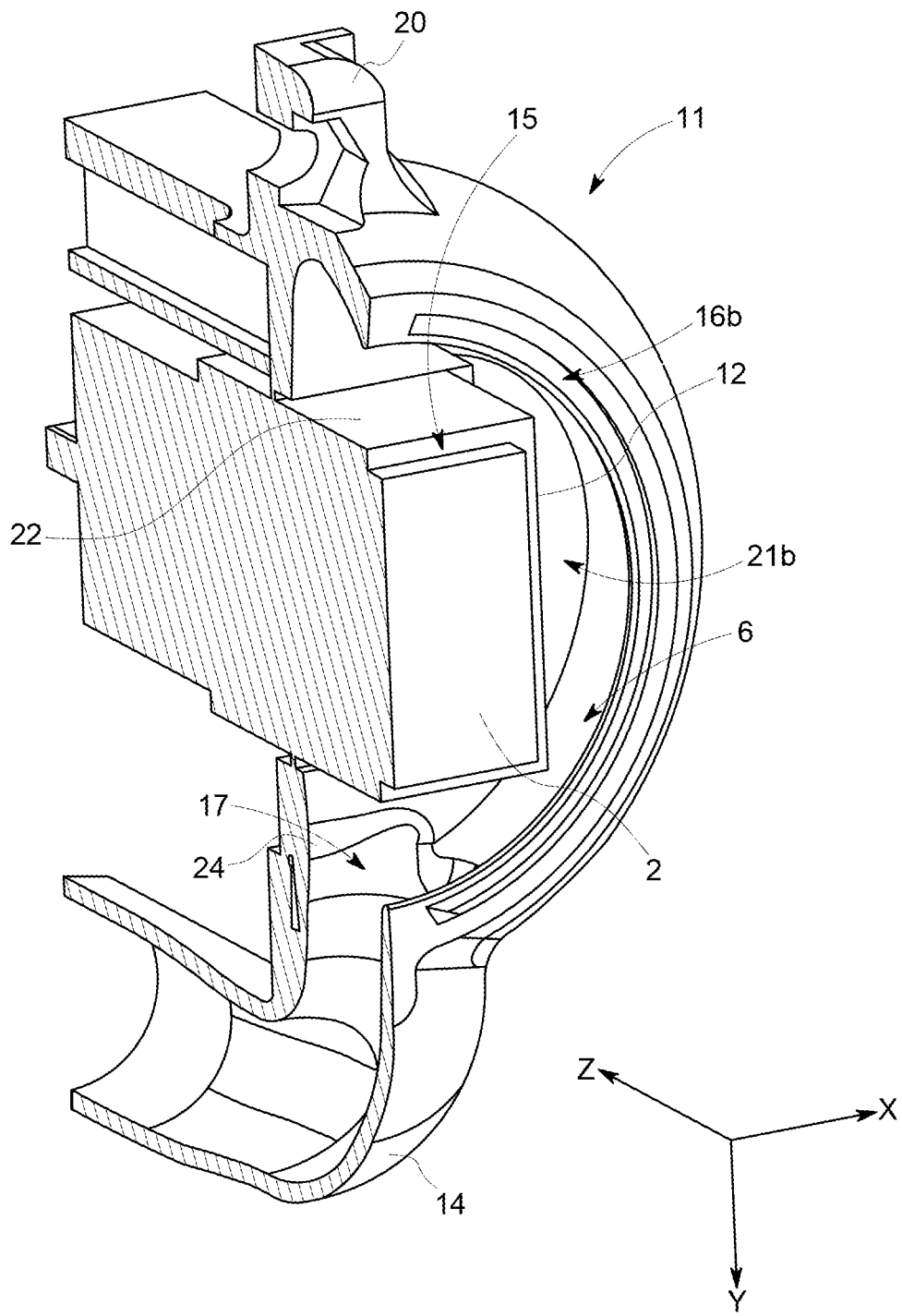
FIG. 5 is a schematic cross-sectional view along the cross-sectional line B-B of the housing illustrated in FIG. 2.

FIG. 5 shows a schematic perspective cross-sectional view of the housing 11 along the cross-section line B-B illustrated in FIG. 2. Here it becomes apparent that the vortex chambers 21a, 21b merge in the region of the inlet 17 and the mounting means 20 so as to form a single cavity within the housing 11. The inlet 17 is provided with a bevel 25 in a transition region between the suction tube 14 and the vortex chambers 21a, 21b. Thereby, the suction tube 14 tapers from the inlet 17 towards a cylindrical portion of the suction tube 14 adapted for connecting a suction device thereto. A vertical height of the inlet 17 including the bevel 25 measured in parallel to the height direction Z is bigger than or at least equals a vertical height of the vortex chambers 21a, 21b measured in parallel to the height direction Z.

Figure 6:
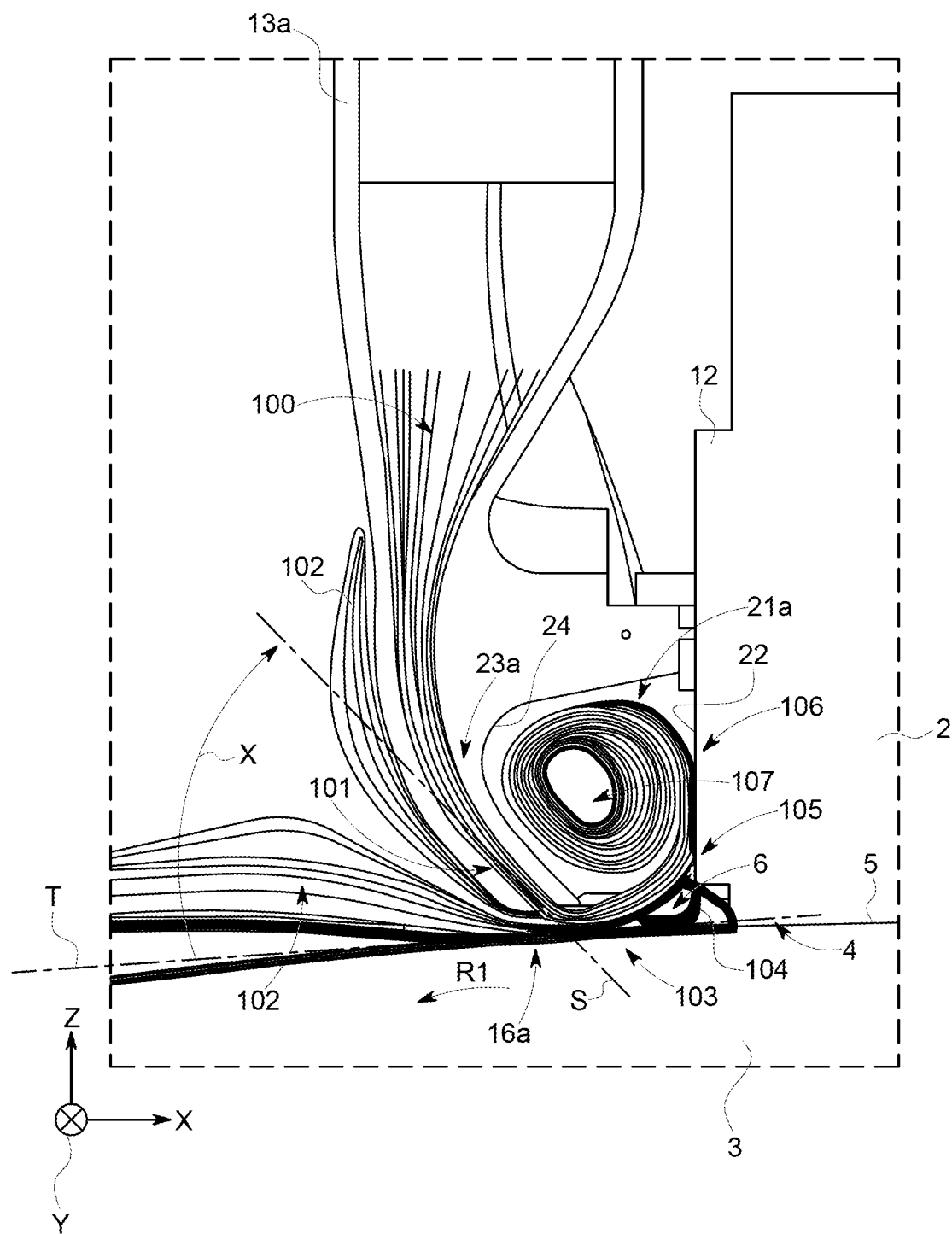
FIG. 6 is a schematic cross-sectional view of a detail D of the installation shown in FIG. 1 along the cross-sectional line A-A illustrated in FIG. 2.

FIG. 6 shows a schematic cross-sectional view of a detail D of the electromechanical machine installation 1 shown in FIG. 1 along the cross-sectional line A-A illustrated in FIG. 2. In operation of the electromechanical machine installation 1, a gaseous medium 100 is blown, i.e. transported, through the supply tube 13a towards the outlet 16a thereof, wherein its velocity is increased due to the structure of the supply tube. A blow stream 101 is formed of the gaseous medium 100 on its way along the guiding section 23a. The blow stream 101 exits the outlet 16a along a stream direction S in the form of an "air blade". The stream direction S has an angle α (alpha) with respect to the tangent T at the point of impact of the blow stream 101 on the outer circumference 5 of the slip ring 3. The present example, the angle α is approximately 50° pointing in a direction opposite to the first rotational direction R1.

When impinging on the outer circumference 5 of the slip ring 3, the blow stream 101 joins with an auxiliary gas stream 102, e.g. outside air surrounding the housing 11. In other words, the blow stream 101 takes the auxiliary gas stream 102 with it so that they together form a combined stream 103. At the same time, the blow stream 101 constitutes an air curtain between the outlet 16a and the circumference 5 of the slip ring 3. This prevents abrasion particles escaping the free space 6 which is effectively shut off from the surroundings of the housing 11.

Due to its impact on the outer circumference 5 of the slip ring 3, the blow stream 101, the auxiliary gas stream 102, and/or the combined stream 103 pickup abrasion particles 104 along the free space 6 which are set free in the contact region 4. The combined stream 103 and the abrasion particles 104 mix with each other so as to form a fluid 105. In other words, the abrasion particles 104 are picked up by the combined stream 103, which is at least partially comprised of the deflected blow stream 101, so as to be transferred into a fluidised state in a single stream.

The fluid 105 enters the vortex chamber 21a located above the free space 6 in the height direction Z. In the vortex chamber 21a, a vortex 106 is formed of the fluid 105. The vortex 106 has an eye 107 arranged essentially in the middle of vortex chamber 21a (according to the view angle of FIG. 6 in the middle of a cross-sectional plane extending in parallel to the longitudinal direction X and the height direction Z through the vortex chamber 21a). Within the vortex 106, the fluid 105 travels circumferentially around the passage 12 until it enters the inlet 17, from where it is sucked off through the suction tube 14 so that any abrasion particles 104 are removed.

Furthermore, besides of the removal of the abrasion particles 104, the blow stream 101, the auxiliary gas stream 102, and/or the combined stream 103 provide a cooling of the outer circumference 5 of the slip ring 3 and the brush 2 around the contact region 4. As the blow stream 101, the auxiliary gas stream 102, and/or the combined stream 103 flow along the outer circumference 5 in the free space 6, they pickup heat from the slip ring 3. Additionally, as the fluid 105 impinges on the tubular wall portion 22 forming the passage 12 for the brush 2, further heat is being picked up and a lower portion of the brush 2 is at least indirectly being cooled.

The invention claimed is:

1. A combined cooling and abrasion particles removal system for providing cooling and removing abrasion particles in a contact region between a brush and a slip ring of an electromechanical machine, the removal system comprising:

a housing;
a passage located through the housing for accommodating the brush and having a front opening adapted to face the slip ring; and
at least one conduit arranged to direct the flow of a gaseous medium towards the face of the slip ring, the at least one conduit comprising at least one supply tube with an outlet, the outlet defining a slit that encompasses the front opening in an annular manner.

2. The combined cooling and abrasion removal system according to claim 1, wherein the housing of the removal system is arranged to leave a gap between the outlet and the slip ring such that air surrounding the removal system is sucked into the area between the system and the slip ring in operation.

3. The combined cooling and abrasion removal system according to claim 1, further comprising a vortex chamber for generating a vortex.

4. The combined cooling and abrasion removal system according to claim 3, wherein the flow of the gaseous medium from the outlet moves abrasion particles into the vortex chamber.

5. The combined cooling and abrasion removal system according to claim 3, further comprising an outer wall portion of the vortex chamber which is curved in such a way that it promotes formation of the vortex.

6. The combined cooling and abrasion removal system according to claim 3, further comprising at least one suction tube with an inlet for extracting the gaseous medium and the abrasion particles from the vortex chamber.

7. The combined cooling and abrasion removal system according to claim 6, wherein the inlet is dimensioned such that it essentially extends over an entire vertical height of the vortex chamber.

8. The combined cooling and abrasion removal system according to claim 6, wherein the inlet widens towards the vortex chamber.

9. The combined cooling and abrasion removal system according to claim 3, wherein the vortex chamber surrounds a tubular wall section forming the passage in an annular manner.

10. The combined cooling and abrasion removal system according to claim 3, wherein the vortex chamber tapers.

11. The combined cooling and abrasion removal system according to claim 1, wherein the at least one conduit has a guiding section for directing a blow stream of the gaseous medium under an angle with respect to a tangent of an outer circumference of the slip ring towards the slip ring.

12. The combined cooling and abrasion removal system according to claim 11, wherein the angle is between 30 and 70 degrees.

13. The combined cooling and abrasion removal system according to claim 11, wherein the guiding section tapers.

14. The combined cooling and abrasion removal system according to claim 11, wherein a cross sectional area of the supply tube remains essentially the same or is at most slightly reduced along the guiding section.

15. A electromechanical machine installation, comprising at least one slip ring; at least one brush contacting the slip ring in a contact region, and at least one combined cooling and abrasion particles removal system according to claim 1 for providing cooling and removing abrasion particles from the contact region.

16. A method for providing cooling and removing abrasion particles in a contact region between a brush and a slip ring of an electromechanical machine, the brush contacting the slip ring, the method comprising:
  placing the brush in a passage located through a housing, the passage having a front opening facing the slip ring;
  directing, via at least one conduit, a gaseous medium towards the face of the slip ring, the at least one conduit comprising at least one supply tube with an outlet, the outlet defining a slit that encompasses the front opening in an annular manner; and
  generating a vortex of the gaseous medium which carries away the abrasion particles.

* * * * *